L. F. LLOYD.
FEED TUB.
APPLICATION FILED MAR. 28, 1921.
1,435,404.
Patented Nov. 14, 1922.
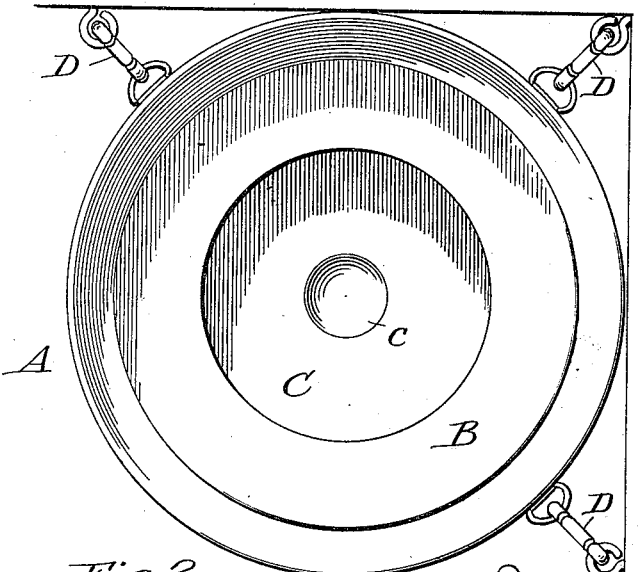
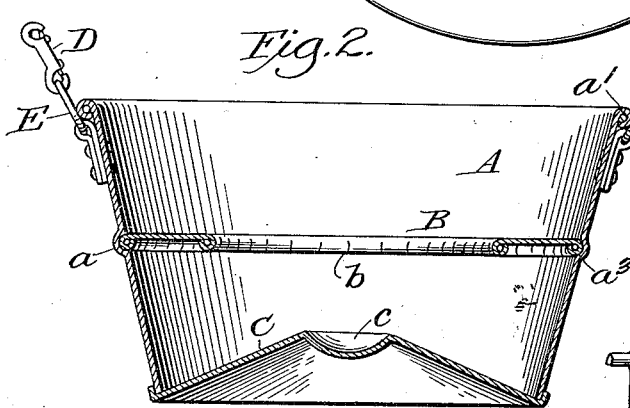
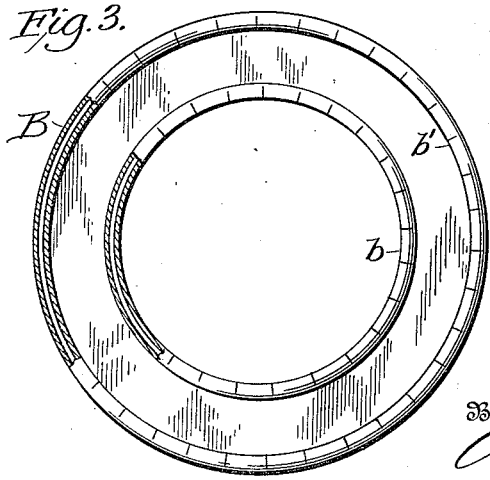
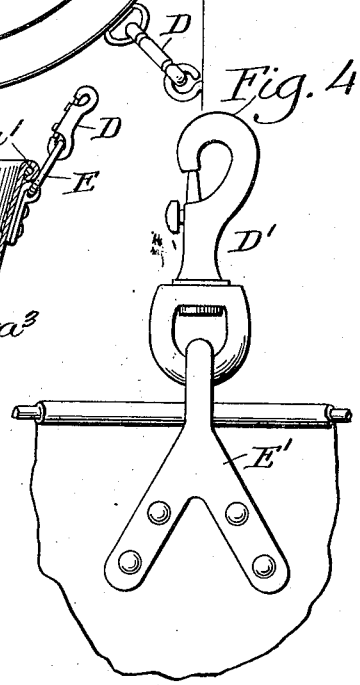
Inventor
Levie F. Lloyd
By Julius C. Dowell
his Attorney Patented Nov. 14, 1922.

1,435,404

UNITED STATES PATENT OFFICE.

LEVIE F. LLOYD, OF LEXINGTON, KENTUCKY.

FEED TUB.

Application filed March 23, 1921. Serial No. 456,345.

*To all whom it may concern:*

Be it known that I, LEVIE F. LLOYD, a citizen of the United States, residing at Lexington, in the county of Fayette and State of Kentucky, have invented certain new and useful Improvements in Feed Tubs; and I do hereby declare the following to be a full, clear, and exact description of the invention, such as will enable others skilled in the art to which it appertains to make and use the same.

This invention relates to means employed for feeding horses and other animals, and more particularly to a feed tub especially designed and adapted for feeding thoroughbred or race horses by securing the same in position for the animal to eat therefrom while standing in a stall or the like.

The primary objects of the invention are to provide a simple, efficient, inexpensive and sanitary device of the character referred to of such construction as to induce the animal to take his food slowly and masticate it properly and to prevent immoderate feeding and waste; also to provide such a device having sufficient strength and rigidity to prevent it from being easily broken or disfigured and rendered useless by rough handling or being knocked against a post or the like, and which may be easily secured in position for use and easily removed.

The invention will first be hereinafter more particularly described, with reference to the accompanying drawings, which are to be taken as a part of this specification, and then pointed out in the claims at the end of the description.

In said drawings, Fig. 1 is a top or plan view of a feed tub embodying my invention, illustrating the device suspended in position for use in one corner of a stall;

Fig. 2 is a vertical sectional elevation of the same, taken on a line parallel with the diametrically opposite snap hooks used for suspending it in position for use;

Fig. 3 is a plan view of a detachable ring-shaped division plate or partition used to provide an annular space for grain or other food between it and the bottom of the tub; and Fig. 4 is a detail view of a modified form of means for suspending the tub in usable position.

In the illustrated embodiment of the invention it comprises a receptacle of tub-like form having a ring-shaped plate or partition detachably secured therein so as to provide a restricted annular food space between it and the bottom of the receptacle and prevent waste, said partition having a central opening therein through which the animal's mouth is inserted to get at the food within said space, the bottom of the receptacle being of conical form, to aid the animal in getting the food in his mouth; means being also provided for detachably securing the vessel to a fixture or suspending it in one corner of a stall, or the like. But other forms may be employed having the essential and characteristic features of my invention, the form shown being preferred.

Referring to the drawings, in which the same reference letters are used to denote corresponding parts in different views, the letter A denotes a tub-like vessel, which is preferably constructed of galvanized steel plate or sheet metal in which is formed by pressing or stamping a strengthening rib $a$, between the top and bottom of the tub, which is also reinforced around the top by means of a steel rod or wire underlying the outwardly turned edge $a^1$ of the tub, thus forming a rounded upper edge or rim. The body of the tub is preferably frusto-conical in form, and may be made from a metal plate of the required length having one edge turned back upon itself and overlying a steel rod or wire to form the reinforced rim $a^1$, and also having an intermediate depression forming in the finished tub the circumferential exterior bead or strengthening rib $a$; and an interior annular groove $a^3$ for a purpose hereinafter stated. The vessel is provided with a division plate or partition B which is so constructed that it may be sprung into the circumferential groove $a^3$ and firmly held therein against accidental displacement or removal, by virtue of its resiliency and frictional contact with said groove. It may be removed however by the application of pressure from below sufficient to dislodge it from the groove. The partition B is preferably constructed of sheet metal, in ring-shaped form, having the outer and inner edges thereof slitted and turned back upon itself to form flaps $b$ and $b^1$, which overlie and secure thereto wire or steel rods which extend around the edges of the plate and serve to reinforce and strengthen the same, and at the same time render it resilient or springable to adapt it to be sprung into said groove; said flaps $b$ and $b^1$ being arranged on the under side of the plate when it is placed in the tub. The bottom C of the tub is substantially conical in form and may be soldered or otherwise secured to the lower end of the cylindrical body, being preferably about sixteen inches in diameter and the upwardly sloping surface thereof terminates short of the apex of the cone, which is concave or depressed, as at $c$, to enable the animal to more easily get a mouthful of the feed contained in the receptacle below said division plate or partition. The surface of the cone rises to about three fourths of an inch at the center where it is truncated or depressed to form the concavity $c$, which is about two inches in diameter. But the tub may be constructed of any desired size, the proportions stated being a matter of preference. For feeding sick horses, or where dry, dusty food is used, it may be desirable to provide means for ventilating the space beneath the solid ring plate, and to this end the ring may be provided with a series of holes for ventilation. For the purpose of securing the feed tub in one corner of a stall or other suitable fixture, or to the head of a horse or other animal in position to enable the animal to insert his mouth in the central opening through the ring-shaped plate or partition, securing devices D, D, having a snap-hook at each end may be secured at one end to links E, E, which are hinged or pivoted to the rim of the feed tub; two of said double hooks being arranged diametrically opposite each other and a third one between the other two, as shown.

Fig. 4 of the drawings illustrates a modified form of securing device in which the double snap hooks are replaced by single snap hooks $D^1$, each of which has its shank swiveled to a loop that is carried by a bracket or ear-piece $E^1$, which is riveted or otherwise secured to the tub, the single snap hooks being arranged the same as the double hooks, so that in either form the free ends of the hooks may be connected to eye bolts, rings or the like in one corner of a stall, as shown in Fig. 1. The free ends of the two hooks which are diametrically opposite each other are connected to eye-bolts or the like secured to the vertical walls of a stall, or other fixture, which extend at right angles to each other, while the third hook is connected to an eye-bolt or the like arranged between the other two eye-bolts, at the meeting edges of said walls, as shown, for example, in Fig. 1 of the drawings, or said hooks, if desired, may be connected with a strap or rope passing over the animal's head and having hooks or eyes on the depending ends thereof for engagement with said snap hooks, in such manner that the feed tub may be sutained in a horizontal position.

The utility and advantages of this feeding device are obvious. It has been demonstrated in practical use that thoroughbred horses and voracious feeders may be brought into subjection and moderate feeding by the use of this device. By moderate feeding I do not mean to say it reduces the quantity of feed, but it causes the animal to take the feed slowly and masticate it properly. While it is designed more particularly for feeding horses, especially thoroughbred horses, it may be used for feeding mules, oxen, cows or other animals, and may also be used for watering animals, either with or without the ring-shaped plate, though the latter is preferably removed when used for watering. It is adapted to be used for any kind of feed, either wet or dry, such as corn, oats, or molasses feed, or "bran feed," which is the most important feed for thoroughbred horses, and cannot be used in ordinary feed bags, fastened over a horse's head, for the reason that this feed consists of shelled oats and bran cooked in water and fed while warm, and the steam would affect the horse, and the feed being wet is also heavy and bulky. The conical bottom is made so that its highest point is directly under the central opening in the ring-shaped plate and its surface is so sloped that when the feed is put into the vessel it must scatter under the ring and against the circular side wall, rendering it impossible for the animal to get a large mouthful, which will prevent him from raising his head out of the vessel and letting the feed fall to the floor, and the animal cannot remove the ring, because he cannot pull straight upward. The only pressure an animal can exert thereon is sidewise, which only pushes the ring against the side wall and will have no effect in loosening the ring or causing it to come out. This feed tub also prevents waste, which results when a horse gets his mouth full, more than he can chew, and holds his head outside of the feed trough so as to let the feed fall to the floor or ground, as there is ample room for the feed to be distributed under the ring-shaped partition plate and the animal cannot get more than he can comfortably chew. The ring-shaped plate also prevents the animal from dragging the feed out over the sides of the vessel. Other advantages of this feed tub are that being constructed of metal, and all parts with which the animal's nose contacts being made round, and as there are no corners or crevices to collect dust, it can be easily cleaned and is absolutely sanitary. These feed tubs also economize space in storage or transportation, as they are made of such size and shape that they may be nested together very closely, by placing the tubs one within another; the ring-shaped plates being removed and placed in the uppermost tub.

Having thus described my invention, what I claim as new and desire to secure by Letters Patent is:

1. An animal feeding device comprising a tub-like vessel having a substantially conical bottom, and a ring-shaped partition removably secured within said vessel and having its central opening arranged over the apex of the cone, thus providing an annular food space between said bottom and said partition which is unobstructed and gradually increases in depth from the center to the outer circumference or base of the cone.

2. An animal feeding device comprising a tub-like vessel having a substantially conical bottom and a ring-shaped plate removably secured therein, said plate being spaced from said bottom so as to provide an annular food space between it and the convex surface of the bottom, and having its central opening arranged over the apex of the cone, the apex of the cone being slightly concave.

3. An animal feeding device comprising a metallic tub-like vessel having a substantially conical bottom and an interior circumferential groove between its top and bottom, and a ring-shaped space or partition confined in said groove by the resiliency of the metal of which the vessel is formed and having its central opening arranged over the apex of the cone.

4. An animal feeding device comprising a tub-like vessel having a substantially conical bottom and a ring-shaped division plate or partition having its central opening arranged over the apex of the cone together with means attached to said vessel at substantially diametrically opposite points and at an intermediate point for securing it in one corner of a stall so as to prevent it from being tilted.

5. An animal feeding device comprising a tub-like vessel having a substantially conical bottom and a circumferential groove in its inner wall intermediate its top and bottom, a ring-shaped plate removably secured in said groove, said plate having a central opening arranged over the apex of the cone and spaced from said bottom so as to provide an annular space for feed between it and said bottom, and means for suspending said vessel in one corner of a stall and sustaining it in a horizontal position; said means comprising two snap-hooks secured to said vessel at substantially diametrically opposite points and a third snap-hook secured thereto at an intermediate point.

6. A feed tub constructed of sheet metal having a rounded and reinforced upper edge or rim and a substantially conical bottom slightly concave at the apex of the cone, a ring-shaped partition plate removably secured in said tub substantially intermediate the ends thereof so as to provide an annular space for feed between it and the convex surface of said bottom, and means for suspending said tub in position for use and holding it so as to prevent tilting.

7. A metallic feed tub having a substantially conical bottom, and a ring-shaped plate removably secured therein, the sloping surface of said bottom terminating in a concavity at the apex of the cone, said plate having a central opening arranged over said concavity.

8. A feed tub composed of sheet metal having a cone-shaped bottom and a circumferential re-inforcing rib, said rib being of concavo-convex form to provide an interior circumferential groove, and a sheet metal plate removably secured in said groove and held therein by the resiliency of the metal, said plate having a central opening arranged over the apex of the cone, whereby an annular unobstructed food-space is provided below said plate and around said opening which gradually increases in depth from the center to the circumference or base of the cone.

9. In combination, a feed tub constructed of sheet metal having a bottom of approximately cone-like form with upwardly sloping surface terminating in a concave apex, and having a ring-shaped plate or partition removably secured therein so as to provide an annular space for feed between it and said bottom, and detachable means for suspending said tub in one corner of a stall in such manner that it will be sustained in a horizontal position.

10. In combination, a feed tub constructed of sheet metal having a bottom of approximately cone-like form with upwardly sloping surface terminating in a concave apex, and having a ring-shaped plate or partition removably secured therein so as to provide an annular space for feed between it and said bottom, and snap hooks flexibly connected with said tub, two at diametrically opposite points and a third one between the other two, for detachably supporting the tub in one corner of a stall in such manner that it will be sustained in a horizontal position.

In testimony whereof I affix my signature in the presence of two witnesses.

LEVIE F. LLOYD.

Witnesses:
DAISY W. HAYS,
T. T. FORMAN.